United States Patent Office 3,432,805
Patented Mar. 11, 1969

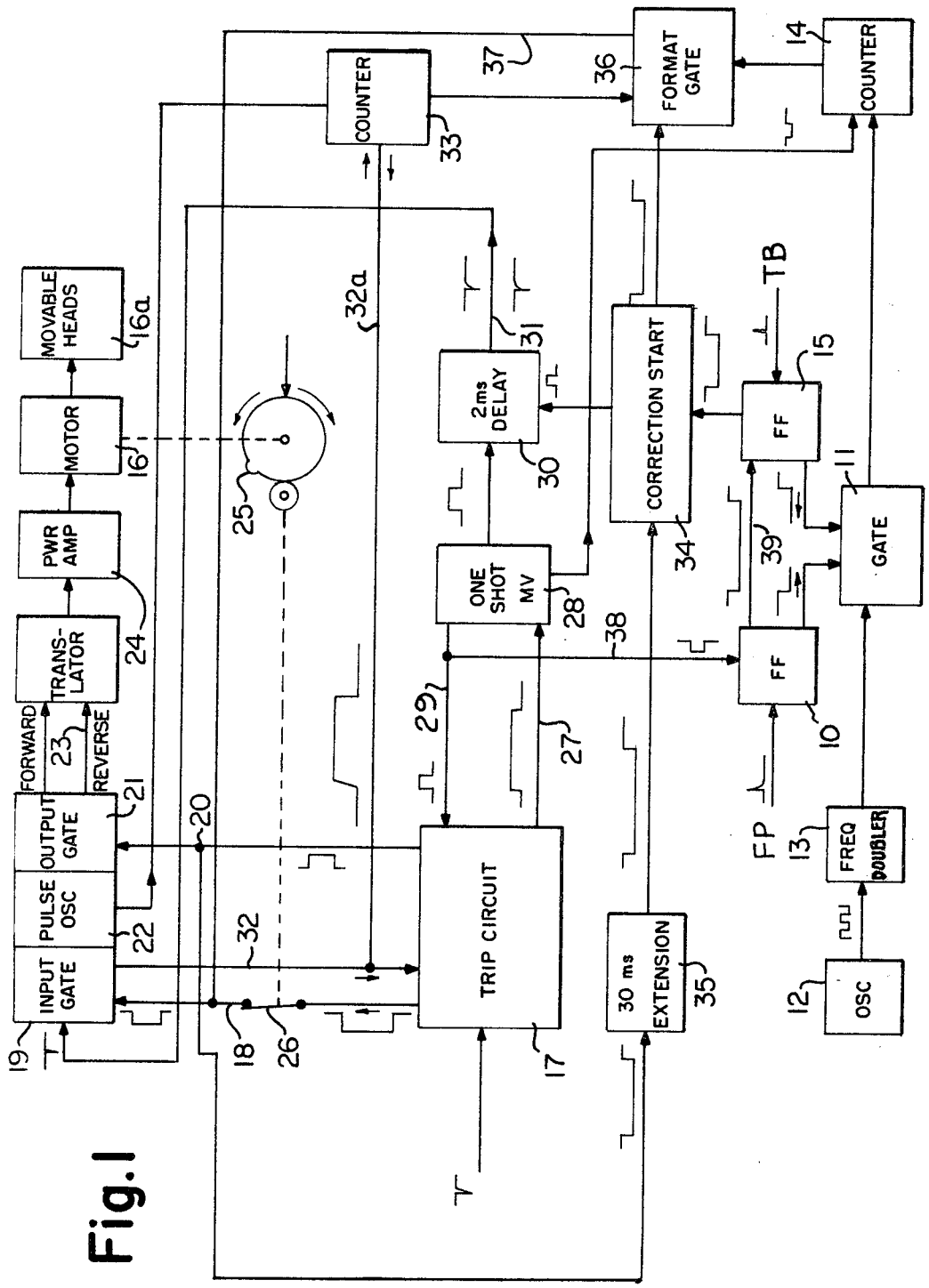

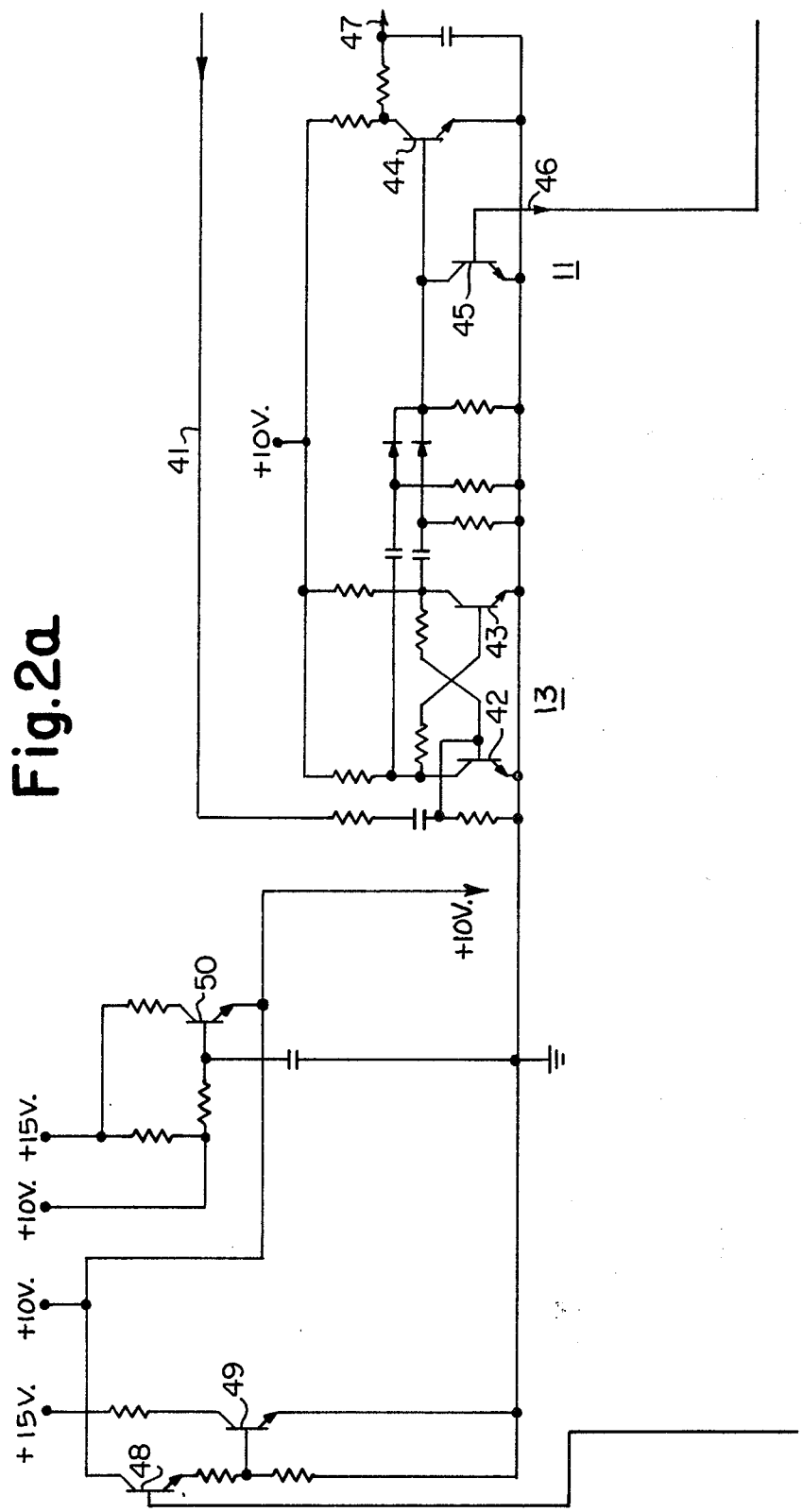

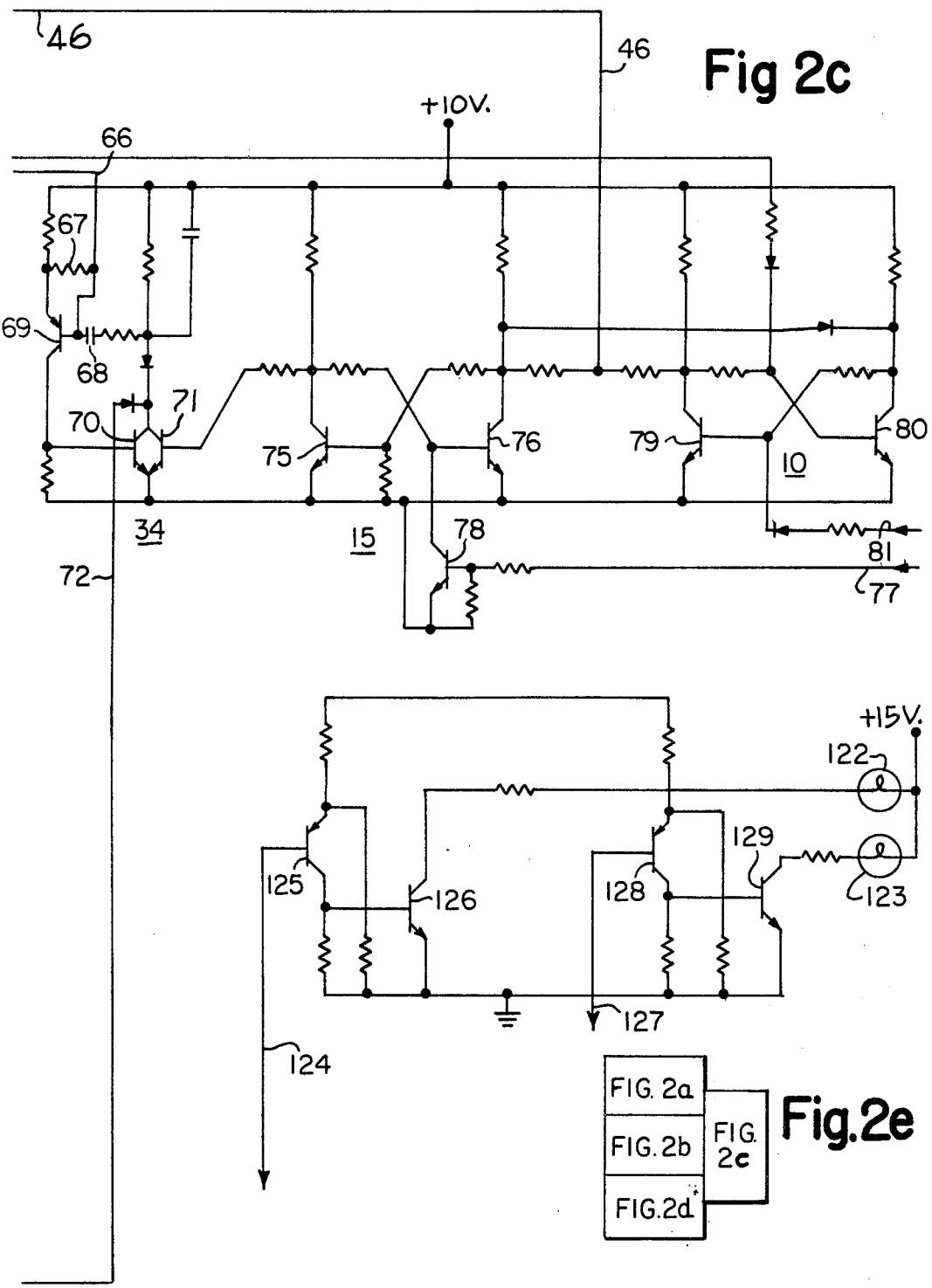

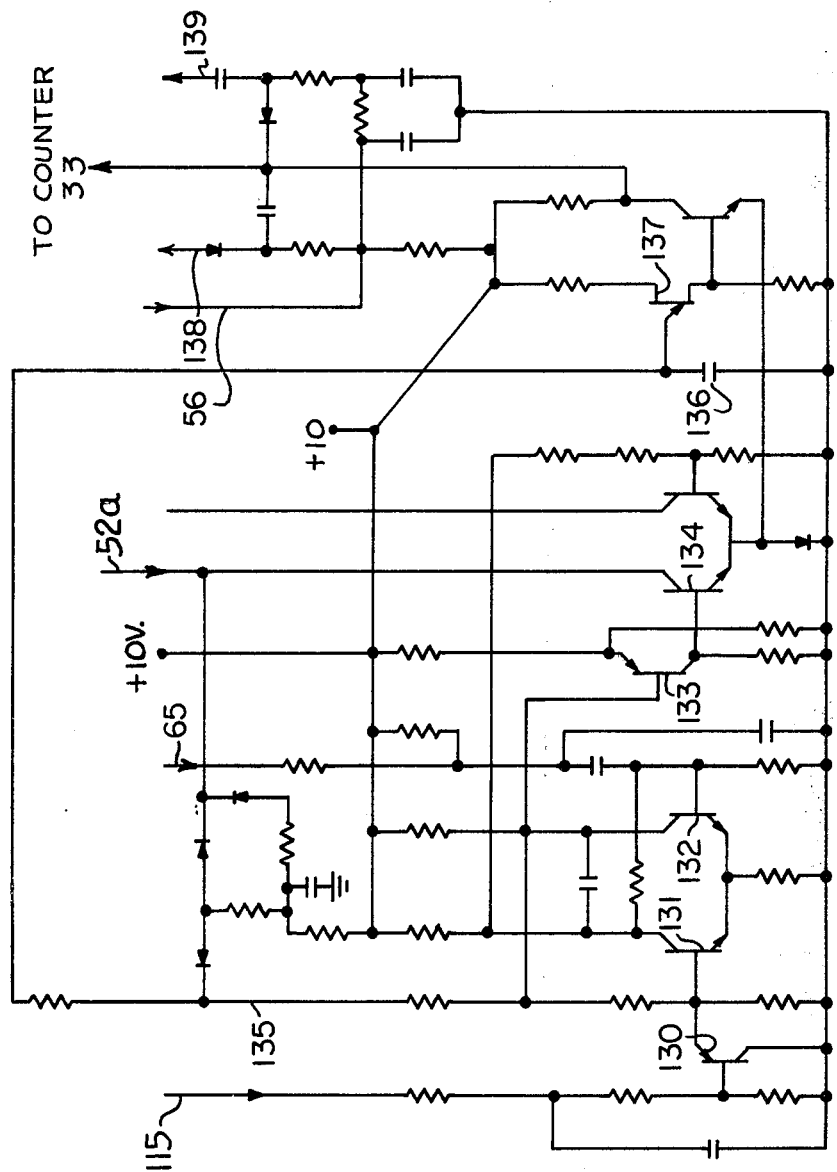

3,432,805
TIME BREAK CORRECTOR FOR MARINE SEISMIC SIGNALS
Francis M. Romberg, Irving, Tex., assignor to Mobil Oil Corporation, a corporation of New York
Filed Jan. 31, 1968, Ser. No. 702,046
U.S. Cl. 340—15.5                    9 Claims
Int. Cl. G01v 1/24

ABSTRACT OF THE DISCLOSURE

A marine seismic source is triggered by a firing signal produced when the magnetic drum recorder is in a particular position. The variable delay between the firing signal and the actual seismic impulse is compensated for by a corrector system. Movable playback heads on the seismic signal recorder are positioned by the corrector system so that the signals reproduced by these heads are in correct time relation to the actual seismic impulse. The corrector system includes first and second counters and a comparator for determining when the proper correction has been made.

*Background of the invention*

Recent advances in marine seismic exploration have included the use of pneumatic-powered seismic sources. For example, in the copending application of my co-worker George B. Loper, Ser. No. 534,130, now Patent No. 3,397,755, there is described a source in which compressed diesel fuel and air are exploded to produce a sharp burst of seismic energy. In such a source, there is an unavoidable variable delay between the firing signal and the actual seismic impulse. This delay is caused by the reaction time of electromechanical and pneumatic elements of the source.

In order to composite the seismic signals produced by the seismic source, it is necessary to compensate for this variable delay. Specifically, it is desirable to record the signals on a magnetic tape drum which each firing instant at a fixed position on the tape.

Prior art systems for compensating for the variable delay have not been completely satisfactory. Some systems provide automatic measurement of the variable delay but require intervention by the operator to compensate for the delay.

Other automatic systems are not completely satisfactory for use with a marine source. One example of prior art systems for compensating for variable delay is shown in U.S. Patent 2,851,122 to McCollum. This system compensates for the variable delay between the release of a weight and the seismic impulse produced when the weight strikes the earth.

*Summary of the invention*

This invention relates to seismic exploration and, more particularly, to a system for correcting the variable time delay between the firing signal and the actual seismic impulse produced by a marine seismic source.

In accordance with one embodiment of the invention, a firing signal is produced at a fixed time with reference to the tape drum. This firing signal is applied to the seismic source to initiate the production of a seismic impulse. The resultant seismic signal is recorded by fixed record heads, one record head for each signal channel. Movable playback heads are located approximately one-half second behind the record heads. The movable playback heads are moved to a position such that the signals which they produce are in correct time relation to the actual seismic impulse, rather than in fixed time relation to the firing signal.

The corrector system for moving the heads includes first and second pulse counters. Periodic clock pulses are applied to the first pulse counter starting with the firing signal and terminating with the time break signal which indicates the time of occurrence of the actual seismic impulse.

After the time break signal and after the movable heads have been returned to a home position by the motor which drives them, a correction cycle is initiated. In this correction cycle pulses are applied to a motor which moves the playback heads to a correction position. These pulses are also applied to the second pulse counter. A comparator senses the count in the first counter and the count in the second counter to determine when the proper correction has been applied by the motor to the playback heads. At this time, the application of pulses to the motor and to the second counter is terminated.

The seismic signals are reproduced by the playback heads and are rerecorded on another tape drum. The rerecorded seismic signals have the correct time relation to the actual seismic impulse and, hence, have the same time relationship with respect to one another. These rerecorded seismic signals can be composited.

The foregoing system has several advantages over prior art systems. The corrector system performs the correction cycle in a manner which does not interfere with the recording or playback of the seismic signals. There is no movement of the record heads while a signal is being recorded and there is no movement of the playback heads while signals are being reproduced. Further, the correction cycle is performed after the time break signal thereby insuring that the first counter contains a complete and correct count before the correction cycle is initiated.

Also, the corrector system automatically corrects the seismic signals without intervention by the operator.

*Description of the drawings*

A particular embodiment of the invention will now be described with reference to the accompanying drawings in which:

FIG. 1 is a block diagram of the corrector system;
FIGS. 2a–2d are circuit schematics of the time break corrector;
FIG. 2e is a diagram of the manner in which FIGS. 2a–2d fit together to form a circuit diagram,
and
FIG. 3 is a schematic diagram of the gate circuit.

*Description of a particular embodiment*

Figure 1A:
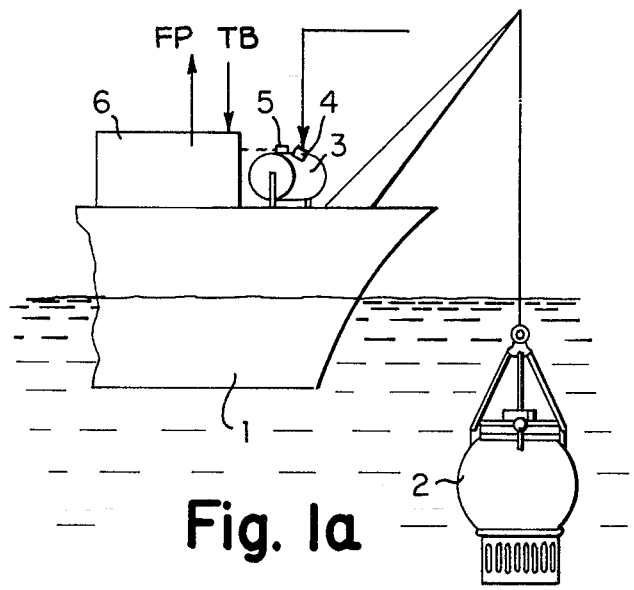
FIG. 1a is a diagram of a marine seismic exploration system.

Before describing the corrector system shown in block form in FIG. 1, reference is first made to FIG. 1a showing the overall marine seismic exploration system. The exploration ship 1 tows the marine seismic source which may be of the diesel gun type described in the aforementioned Loper application. Seismic energy from the source 2 is reflected from subsurface formations and detected by geophones (not shown) also towed by the exploration ship.

The magnetic drum type recorder 3 records seismic signals from the geophones. The signals are applied to record heads 4 for recording on the magnetic drum. In order to record all seismic signals in approximately the same time relationship on the magnetic drum 3, the firing of the source is synchronized with the rotation of the magnetic drum 3. In one particular embodiment of the invention, the firing pulse for triggering the source occurs 50 milliseconds after the occurrence of a reset pulse produced at the time when the seam in the magnetic tape on the drum passes beneath record heads 4.

Although the source 2 is triggered by the firing pulse, the actual seismic impulse occurs a variable time after triggering. The actual occurrence time is sensed by a device mounted on the source 2. This device produces a time break signal representing the actual occurrence time of the impulse of seismic energy. In order to compensate for the variable time delay between the firing pulse and the time break signal, the time break corrector system 6 is provided. As will be explained in more detail with reference to FIG. 1, the time break corrector system includes means for measuring the elapsed time between the firing pulse and the time break signal and includes a motor which moves the playback heads 5 along the magnetic drum to compensate for the variable delay. The signals played back by the playback heads 5 are rerecorded on another magnetic drum (not shown) which is attached to the same shaft as the drum 3. Signals from several seismic impulses are thus rerecorded in correct time relation to the actual seismic impulse. After the desired number of seismic signals have been recorded, a broad head picks up the signal which is the sum, or composite, of the signals on the several channels that were rerecorded.

Figure 1B:
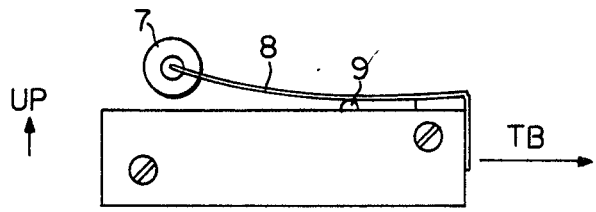
FIG. 1b is a diagram of the inertia switch used to produce the time break signal.

One suitable type of device for producing the time break signal is shown in FIG. 1b as an inertia switch mounted on the seismic source 2. It includes a roller 7 mounted on the end of a leaf spring 8. The seismic impulse causes a sudden upward motion of the source which depresses the actuator 9 of the switch thereby producing the time break signal.

*Time corrector system block diagram FIG. 1*

In the description of FIG. 1, reference will be made to certain signals which have the following time relationship. The time $t_0$ is the time of the reset pulse, produced when the seam of the magnetic tape on the drum passes beneath the record heads. The time $t_h$ is the time when the motor, which drives the movable playback heads, reaches its home position. The motor is returned to its home position after the performance of a correction cycle. The time $t_c$ is the time when a correction cycle starts. The firing pulse FP occurs 50 milliseconds after the reset pulse $t_0$ and the time break signal TB is produced by the inertia switch as previously described.

The firing pulse sets the firing pulse flipflop 10 which opens the gate 11. Periodic clock pulses having a 2K Hz. repetition rate, produced by the 1K Hz. oscillator 12 and the frequency doubler 13, are passed through gate 11 to a first counter 14.

The time break signal sets the time break flipflop 15 which closes the gate 11. The first counter 14 counts pulses between the firing pulse and the time break signal.

During a correction cycle, a number of pulses equal to the count in the first counter minus sixty-four is applied to and indexer which pulses a stepping motor 16 forward that many times. The indexer may be of the commercially available type identified as a Slo Syn Indexer, available from Superior Electric Company, Model No. SP250–4. The motor 16 is geared to move movable playback heads 16a to advance them a distance equivalent to one-half millisecond for each step of the motor. For example, if the time break lags the firing pulse by 50 milliseconds, the playback heads move toward the time break by thirty-six steps which is equivalent to 18 milliseconds. This makes the time break signal appear to be delayed by 32 milliseconds after the firing pulse. All seismic records are corrected to this same apparent delay.

After the recording, and before the next firing pulse, the movable playback heads 16a are moved back to their home position. If the next time break is delayed by 40 milliseconds, for example, the movable playback heads 16a are moved toward the record heads by 8 milliseconds. Again, the played back seismic signal will appear to be delayed by 32 milliseconds. All subsequent seismic signals are played back with the same 32 millisecond delay, thus making the time relation of these signals to the time break signal correct.

Assume now that a correction cycle has just been completed and the movable playback heads 16α are away from their home position. The reset pulse $t_0$, synchronized with the tape drum, turns on a trip circuit 17. The trip circuit 17 applies a positive-going voltage over line 18 to the input gate 19. The trip circuit 17 simultaneously applies a negative-going reverse signal over line 20 to the output gate 21. This conditions the output gate 21 to apply pulses from oscillator 22 over the reverse line 23 to the translator. These pulses act through power amplifier 24 to reverse the motor 16. When the motor 16 reaches its home position, a cam 25 on the motor shaft opens the switch 26 thereby returning the line 18 to ground potential at time $t_h$. This disables the input gate 19 and no further reversing pulses are applied to the motor.

In order to start the pulse oscillator 22, the output of the trip circuit, which goes positive at reset time $t_0$, is applied over line 27 to the one-shot multivibrator 28. The multivibrator 28 produces a 10 millisecond gate which is applied over the line 29 to the trip circuit 17 to hold it on for this time period. The output of the multivibrator 28 is also applied through the 2 millisecond delay circuit 30 which generates a pulse at time $t_0+2$ milliseconds. This pulse is applied over line 31 to the input gate 19 to start the pulse oscillator 22.

When the cam 25 on the motor shaft opens the microswitch 26, the line 18 returns to ground potential thus disabling the input gate 19. The gate 19 stops the oscillator 22. At this time, $t_h$, a voltage from the input gate 19 is also applied over line 32 to reset the second counter 33 and to turn off the trip circuit 17.

The motor 16 and movable heads 16a are now at the home position and a correction cycle can be initiated. However, the circuitry is such that the motor cannot be reversed immediately. Therefore, the signal which enables the correction start circuit 34 is delayed by 30 milliseconds. In order to do this, the reverse signal on line 20 is applied through a 30 millisecond extension circuit 35 to the correction start circuit 34.

The signal on line 20 goes negative at reset time $t_0$. This negative-going waveform is applied through the 30 millisecond extension circuit 35 to the correction start circuit 34 to disable the correction start circuit while the motor 16 and heads 16a are being returned to the home position. When the motor reaches home, time $t_h$, the input to the 30 millisecond extension goes positive. However, the output does not go positive until 30 milliseconds later. This enables one input to the correction start circuit 34.

The other input to the correction start circuit 34 is enabled when the time break flip-flop 15 is set by the time break pulse. When both inputs of the correction start circuit 34 have been enabled, the output goes positive to start a correction cycle. This time is referred to as $t_c$ and it occurs after the movable playback heads 16a have been positioned to a home position and after the occurrence of the time break signal.

The output of the correction start circuit 34 is applied to the 2 millisecond delay circuit 30 to generate a pulse which is applied over line 31 to the input gate 19 to start the pulse oscillator at $t_c+2$ milliseconds. The output of the correction start circuit is also applied to the format gate 36 which compares the count in the first counter 14 to the count in the second counter 33. When this comparison indicates that the movable playback heads 16a are in a position which will play back seismic signals a predetermined time after the occurrence of the time break pulse, the line 37 returns to ground potential, thereby disabling the input gate 19 and terminating the application of pulses to the motor 16.

Provision is also made for resetting several of the circuits. Note that the output of the one-shot multivibrator 28 is applied over line 38 to reset the firing pulse flip-flop 10 at reset time $t_0$. The output of the one-shot multivibrator 28 is also applied to the first counter 14 to reset it. The output of the firing pulse flip-flop 10 is applied over line 39 to reset the time break flip-flop 15 at reset time $t_0$.

When the second counter 33 is counting, the reset line 32a rises in potential to hold the trip circuit 17 on during this time. A voltage on line 32a is sufficient only to hold the trip circuit on—not to turn it on. Thus, the rise in voltage on line 32a serves to hold the trip circuit *on* while the movable heads are being returned home, but will not turn the trip circuit on while the playback heads are being moved into the correction position.

At the end of the correction cycle the reset pulse initiates the movement of the movable heads 16a back to the home position and the foregoing operation is repeated. This operation will be better understood from the following detailed description of the circuit components making up the system.

Description of the circuitry

The corrector system circuitry is shown in FIGS. 2a–2d which fit together to form a complete circuit diagram. Certain well-known circuits have not been shown. The counters 14 and 33 of FIG. 1 have not been shown in detail. These counters are conventional electronic counters and in one specific embodiment of the invention a counter commercially available from Superior Electric Company was used. For each counter, two Superior Electric Company No. DHM144014G1 counter cards converted to binary counting were used.

The translator and power amplifier 24 of FIG. 1 are also commercially available as Superior Electric Company circuit cards No. GHM144021G1 and EHM144018G2 respectively.

Frequency doubler 13, gate 11 and voltage regulators (FIG. 2a)

Referring to FIG. 2a, 1K Hz. pulses from a suitable clock oscillator are applied over the line 41 to the frequency doubler and pulse shaper network which includes transistors 42, 43 and 44.

The transistor 45 forms the gate circuit 11 of FIG. 1. The line 46, connected to the base of transistor 45, controls the conductivity of transistor 45. When transistor 45 is conducting, 2K Hz. pulses are not applied to the output line 47. However, between the time of the firing pulse and the time of the time break pulse, the transistor 45 is rendered nonconducting and in this time period 2K Hz. pulses appear on the output line 47. The output line 47 is connected to the first counter 14 of FIG. 1 which counts the number of pulses between the firing pulse and the time break signal.

Transistors 48, 49 and 50 are voltage regulators. Voltages of +15 and +10 volts are applied to the remaining circuitry.

Figure 2B:
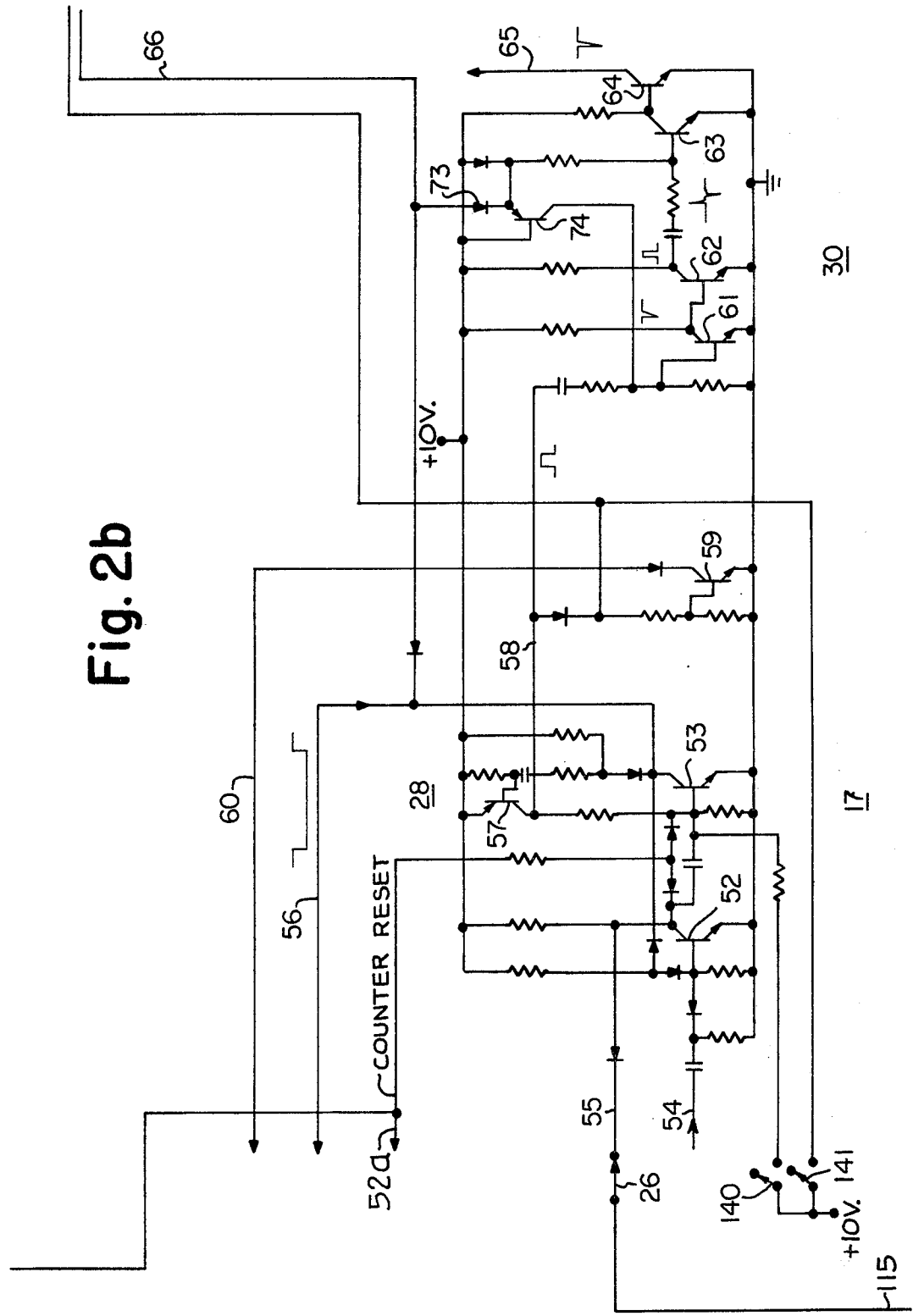

Trip circuit 17, multivibrator 28 and 2 millisecond delay circuit 30 (FIG. 2b)

Transistors 52 and 53 are included in the trip circuit 17 of FIG. 1. The reset pulse is applied over line 54 to trigger the trip circuit. The resulting positive-going waveform on the line 55 is applied through the microswitch 26, which is opened by the cam on the motor shaft, to the input gate circuitry 19.

A negative-going waveform is produced on the line 56. This is applied to the output gate 21 (FIG. 1) so that after the reset time, reversing pulses will be applied to the motor to drive it to its home position.

When the trip circuit is triggered, the one-shot multivibrator, which includes transistor 57 and associated circuitry, is fired. The one-shot multivibrator generates a 10 millisecond positive-going pulse on the line 58. This output pulse is inverted in the inverting amplifier transistor 59, the output of which is applied over line 60 to reset the counter 14 of FIG. 1.

The output of the one-shot multivibrator on line 58 is also applied to a 2 millisecond delay circuit which includes transistors 61–64. The delayed start pulse is applied over line 65 to the input of gate 19 which starts the pulse oscillator 22 (FIG. 1).

Correction start circuit 34, time break flip-flop 15, firing pulse flip-flop 10, 30 millisecond extension 35 (FIG. 2c)

The reverse signal from the trip circuit, on line 66, is negative-going at rest time $t_0$, and tends to return to a more positive level at time $t_h$. However, the network including resistor 67 and capacitor 68 prevents the voltage from switching to the more positive level immediately. Rather, the positive-going switch in level is stretched out for 30 milliseconds to achieve the 30 millisecond extension. After this 30 millisecond extension, the transistor 69 turns off the transistor 70 in the correction start circuit 34. That is, one input to the correction start circuit is enabled 30 milliseconds after the motor reaches its home position at $t_h$.

The other input to the correction start circuit is from the time break flip-flop and is applied to the base of transistor 71. When both transistors 70 and 71 are turned off, the output 72 of the correction start circuit goes positive. This line enables the format gate 36 (FIG. 1) to compare the count in the two counters.

Note that when the correction start circuit 34 is enabled, a positive-going pulse from line 66 is coupled through diode 73 and transistor 74 (FIG. 2b) to the input to the 2 millisecond delay circuit. (Specifically, the pulse is coupled to the base of transistor 61, the first transistor in the 2 millisecond delay circuit.)

The time break flip-flop 15 includes the transistors 75 and 76 (FIG. 2c). The time break signal is applied over line 77 and through the input transistor 78 to trigger the time break flip-flop.

The firing pulse flip-flop 10 includes the transistors 79 and 80. The positive-going firing pulse is applied to the line 81 to trigger the firing pulse flip-flop.

Figure 2D:
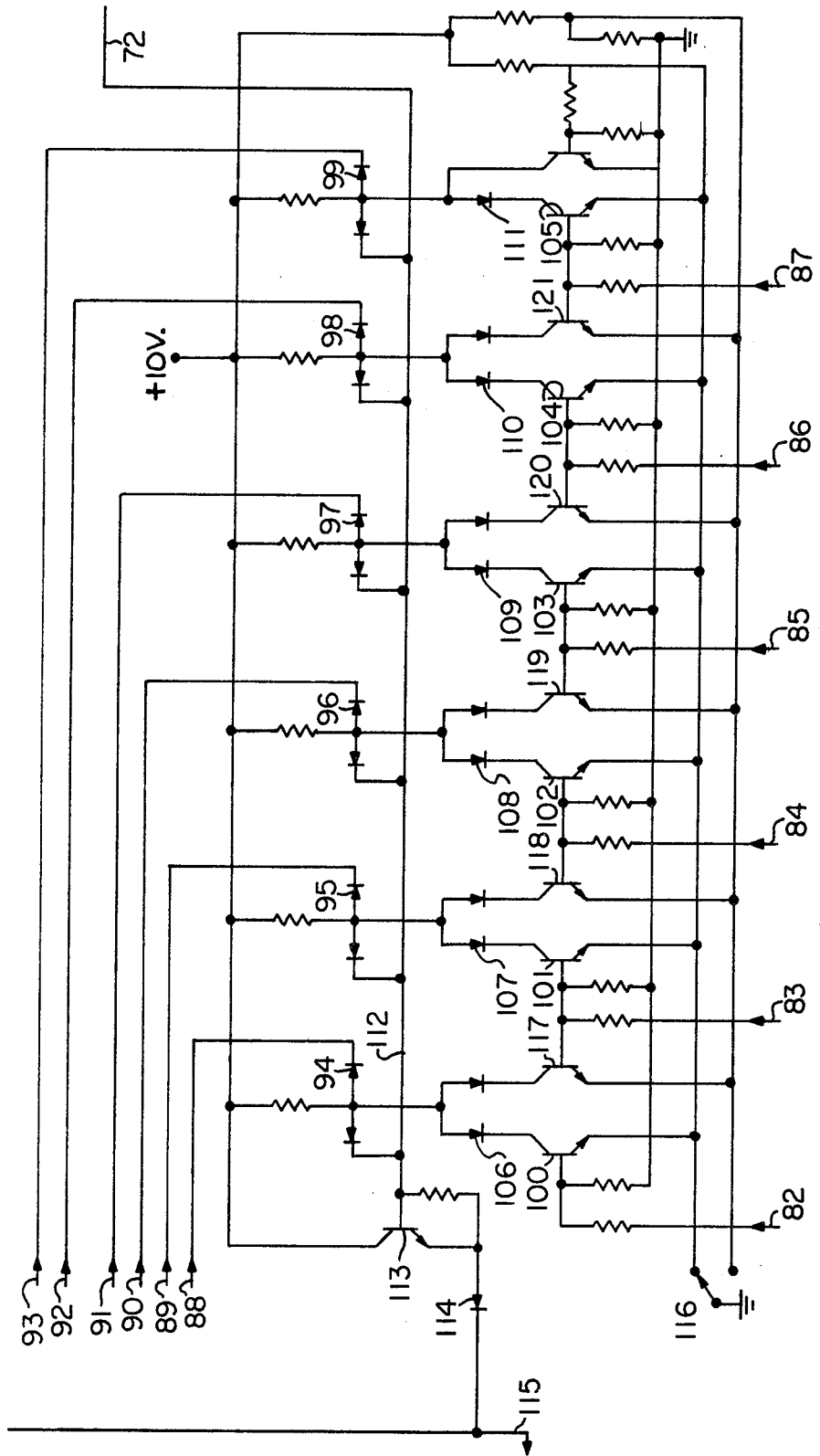

Format gate 36 (FIG. 2d)

The format gate in FIG. 2d compares the counts in the first counter 14 and the second counter 33 during a correction cycle. Each of these counters is an 8-stage binary counter capable of counting between 1 and 128 pulses.

Normally, the count in the first counter will be between 64 and 128 counts because the time break delay is between 32 and 64 milliseconds when the seismic source is operating properly. Because of this, only the outputs from the first six stages of the counter 14 are applied to the format gate.

The output from stage 1 is applied to the input line 82; the output from stage 2 is applied to the input line 83; stage 3 to input line 84; stage 4 to input line 85; stage 5 to input line 86; and stage 6 to input line 87.

The input lines 82–87 are high after the counter has been reset. Certain of the input lines 82–87 will be low after the counter 14 has counted a number of pulses between 64 and 128 and the format of the input lines which are low will uniquely indicate a count between 64 and 128.

The outputs from the first six stages of the second counter 33 are respectively applied to the input lines 88–93. These six lines are respectively connected to diode gates, including didoes 94–99. The input lines 88–93 are all high after the counter 33 (FIG. 1) has been reset. As the stages are successively set during the counting, the corresponding ones of the input lines 88–93 go to a lower potential, thereby successively forward biasing diodes 94–99.

The input lines 82–87 from the first counter are respectively connected through inverting transistors 100–105 to the diode gates. The inverted outputs from the first counter are respectively applied to the diodes 106–111 which form a part of the diode gates. The outputs of these six diode gates are commonly connected to the line 112 which is connected to the base of transistor 113. The emitter of transistor 113 is connected to diode 114 which is, in turn, connected to the input gate which controls the application of pulses to the motor.

When the output line 115 is low, the gate is cut off and pulses will not be applied to the motor. When the line 115 goes high, the gate is opened and pulses are applied to the motor as long as the line 115 is high.

As an example of the operation of the format gate in comparing the counts in the first and second counter, assume that the time break signal lagged the firing pulse by 50 milliseconds. The count in the first counter 14 will be 100 counts. The potential on the input lines 84 and 87 will be low. The potential on lines 82, 83, 85 and 86 will be high.

Before the time $t_c$, the time at which the correction can start, the line 72 from the correction start circuit holds the common line 112 down. At the time $t_c$ the low potential on the line 72 is released. The line 115 rises in potential thereby enabling the gate to apply oscillator pulses to the motor and to the second counter. The line 115 will remain up until the second counter 33 (FIG. 1) has counted 36 pulses. At this time, the lines 90 and 93 from the third and sixth stages of the second counter will be down. Lines 88, 89, 91 and 92 will be up. At this time, the common output 112 of all the diode gates will be down. The output of the first diode gate is down because the inverted output applied to diode 106 is down. The output of the second diode is down because the inverted output applied to diode 107 is down. The output of the third gate is down because the potential applied to the cathode of diode 96 is down. The output of the fourth gate is down because the inverted output applied to the cathode of diode 109 is down. The output of the fifth gate is down because the inverted output applied to the cathode of diode 110 is down. The output of the sixth gate is down because the potential applied to the cathode of diode 99 is down. Since the outputs of all gates are down, the potential on line 115 goes down and the gate which controls the application of pulses to the motor is disabled. Note that the second counter 33 counted 36 pulses, thereby effecting a correction of 18 milliseconds on the movable heads.

In the preceding description it was assumed that the inverting transistors 100–105 applied the inverted outputs of the first counter to the diode gates. These transistors were effective because ground potential was applied to their emitters through the switch 116. The switch 116 is in the position shown when the magnetic drum tape is running at full speed. However, provision is made for running the drum at one-half speed. When this is done, the switch 116 is changed to its other position which applies ground potential to the emitters of transistors 117–121. In this case, the output of the second stage of the first counter is applied through inverting transistor 117 to the first diode gate. The output of the third stage is applied through transistor 118 to the second gate, and so on. That is, the first output of the pulse counter is not used and the remainder of the outputs are shifted down one step. In this case, the motor will run for one-half the number of pulses as are counted in the first counter or, to be more precise, one-half of the largest even number in the count.

In order to indicate proper operation of the seismic source, the pilot lamps 122 and 123 on FIG. 2c are provided. These lamps are selectively energized by the outputs of the seventh and eighth stages of the first counter to indicate when the count properly falls between 64 and 128 counts, i.e., a time break delay between 32 and 64 milliseconds. When the count is greater than 64 the output line 124 from the seventh stage stage of the first counter will be low. This acts through transistors 125 and 126 to energize the lamp 122 to indicate proper operation.

However, if the count exceeds 128, the input line 127 from the eighth stage of the counter will be low and this will act through transistors 128 and 129 to energize the lamp 123. This indicates a time break delay greater than 64 milliseconds and therefore improper operation of the system.

*Gate circuit (FIG. 3)*

The circuits for the input gate 19, output gate 21 and pulse oscillator 22 of FIG. 1 are shown in FIG. 3. This circuitry is commercially available from the Superior Electric Company as circuit card No. DHM144015G1. The circuitry is repeated in FIG. 3 so that the connections to the remainder of the system may be easily seen.

Transistor 130 is the input gate. It maintains transistor 131 in the nonconducting condition unless a positive potential from the format gate or the trip circuit is applied to line 115. If the base of transistor 130 is maintained at a positive potential, the flip-flop including transistors 131 and 132 may be triggered by a ground potential pulse on line 65. Line 65 extends to the output of the 2 millisecond delay circuit in FIG. 2b. The pulse on line 65 triggers the flip-flop, thereby rendering transistor 132 nonconducting.

When transistor 132 is nonconducting, transistors 133 and 134 are cut off also. Positive potential now appears on line 135 which charges capacitor 136. Capacitor 136 together with unijunction transistor 137 form an oscillator. Pulses from this oscillator are supplied to either output line 138 or output line 139. When line 56, which is connected to the trip circuit in FIG. 2d, is at ground potential, output pulses are gated to line 138 to run the motor in reverse. When the line 56 is open circuited, output pulses are gated to output line 139 to run the motor forward in a correction cycle.

When the positive potential is removed from line 115 the flip-flop which includes transistors 131 and 132 is reset. Transistor 134 is turned on. This removes the voltage from line 135, thereby stopping the oscillator.

*Manual controls for testing*

In FIG. 2b, the home-start switch 140 turns on the trip circuit causing the motor to home. By depressing the switch 140 the operator can test whether the motor will properly return to the home position, the reset switch 141 resets the first counter 14 and the time break and firing pulse flip-flops.

While a particular embodiment of the invention has been shown and described, it will, of course, be understood that various modifications may be made without departing from the principles of the invention. The appended claims are, therefore, intended to cover any such modification within the true spirit and scope of the invention.

What is claimed is:
1. In a system for seismic exploration comprising:
    means for initiating the production of a pulse of seismic energy,
    means for sensing the occurrence time of said pulse of seismic energy,
    means for producing a signal representing the elapsed time between the initiation of said pulse of seismic energy and said occurrence time of said pulse of seismic energy,
    a recorder for recording seismic signals on a reproducible medium, and
    time shifting means responsive to periodic pulses for varying the relative time of the recording of said seismic signals on said reproducible medium, the improvement comprising:
- a pulse counter,
- means for applying a train of periodic pulses to said counter and to said time shifting means to correct the relative time of the recording on said reproducible medium, and
- a comparator for comparing the count in said counter with said signal representing elapsed time, said comparator disconnecting said periodic pulses from said time shifting means when said relative time of recording is correct.

2. The system recited in claim 1 wherein said means for initiating the production of a pulse of seismic energy includes means responsive to the recording position of said recorder for producing a firing pulse each time said recorder is in a particular recording position, and wherein said time shifting means corrects the relative time of recording of resultant seismic signals to a constant time relationship with respect to said occurrence time of said pulse of seismic energy.

3. The system recited in claim 1 wherein said time shifting means includes:
- movable playback heads for reproducing seismic signals recorded on said recorder, and
- a motor for moving said movable playback heads with respect to said recorder to change the relative time of playback of said signals with respect to the recording thereof, said periodic pulses being applied to said motor to move said movable heads with respect to said recorder.

4. The system recited in claim further including:
- means for reversing said motor to drive said movable heads to a home position, and
- means for producing a reset signal when said recorder is in a position at which no seismic signals are being recorded or played back, said reset signal being applied to said means for reversing said motor to initiate a homing cycle.

5. The system recited in claim 1 wherein said means for producing a signal representing elapsed time includes:
- a time break delay counter, periodic clock pulses being applied to said time break delay counter between the time of the initiation of the production of a pulse of seismic energy and said occurrence time, and
- a correction start circuit, said correction start circuit being enabled after said occurrence time, said correction start circuit controlling said means for applying periodic pulses to said time shifting means so that the correction of the relative time of recording is not initiated until said time break delay counter has a complete count therein.

6. The system recited in claim 1 for performing marine seismic exploration further including:
- a seismic source responsive to an external firing signal for producing a pulse of seismic energy,
- means for producing a firing pulse when said recorder is in a particular recording position, said firing pulse being applied to said seismic source to initiate the production of a pulse of seismic energy,
- a switch mounted on said seismic source producing a time break signal at the occurrence time of said pulse of seismic energy,
- a time break delay counter,
- a source of periodic clock pulses, and
- gating means responsive to said firing pulse and said time break signal for applying said periodic clock pulses to said time break delay counter, the output of said time break delay counter being said signal representing the elapsed time between the initiation of said pulse of seismic energy and said occurrence time of said pulse of seismic energy.

7. The system recited in claim 6 wherein said means for comparing includes:

format gating circuitry, the output of each stage of said time break delay counter being applied to a gate in said format gating circuitry, the output of the corresponding stage of said pulse counter being applied to a gate in said gating circuitry, said comparator producing an output when the count in said pulse counter is the same as the count in said time break delay counter, said output being applied to said means for applying periodic pulses to said time shifting means to terminate the application of said pulses.

8. Apparatus for use with seismic exploration system of the type in which a firing signal initiates the production of a pulse of seismic energy and a time break signal is produced at the occurrence time of said pulse of seismic energy, said apparatus comprising:
- a magnetic recorder having at least one recording channel for recording seismic signals,
- a movable playback head assocaited with said channel,
- a first pulse counter,
- means responsive to said firing signal and said time break signal for applying periodic clock pulses to said first pulse counter in the time interval between said firing signal and said time break signal,
- a motor responsive to periodic clock pulses for shifting the position of said movable playback head along said channel to shift the time of plyaback of the signal recorded on said channel with respect to the time of recording,
- a second pulse counter,
- means for applying periodic clock pulses to said second pulse counter and to said motor, and
- means for comparing the count in said first pulse counter with the count in said second pulse counter, the application of said periodic clock pulses to said motor being terminated when the comparison indicates that said movable playback head is in a position which will play back signals recorded on said channel a pedetermined time after the occurrence of said time break pulse.

9. A system for marine seismic exploration comprising:
- a source of seismic energy for producing pulses of seismic energy in the water overlaying the earth's surface,
- a magnetic recorder having at least one signal recording channel and a record head associated therewith, signals from a seismic detector being applied to said record head,
- a movable playback head associated with said channel,
- means responsive to the rotational position of said recorder for producing a firing signal, said firing signal being applied to said source of seismic energy for initiating the production of a pulse of seismic energy,
- means on said source of seismic energy producing a time break signal at the occurrence time of said pulse of seismic energy,
- a first pulse counter,
- means responsive to said firing signal and said time break signal for applying periodic clock pulses to said first pulse counter in the time interval between said firing signal and said time break signal,
- a motor responsive to periodic clock pulses for shifting the position of said movable playback head along said signal recording channel to shift the time of playback of the seismic signals recorded on said channel with respect to the time of recording,
- a second pulse counter,
- means for applying periodic clock pulses to said second pulse counter and to said motor after said movable playback head has been positioned to a home position and after the occurrence of said time break signal, and
- means for comprising the count in said first pulse counter with the count in said second pulse counter, the application of said periodic clock pulses to said motor being terminated when the comparison indicates that said movable playback head is in a position which will play back seismic signals recorded on said channel a predetermined time after the occurrence of said time break pulse, the output signal of said movable palyback head being rerecorded on other signal recording channels.

References Cited

UNITED STATES PATENTS 2,849,076  8/1958  Kaufman _____ 340—15.5

RODNEY D. BENNETT, JR., *Primary Examiner.*

CHARLES E. WAND, *Assistant Examiner.*

UNITED STATES PATENT OFFICE
CERTIFICATE OF CORRECTION

Patent No. 3,432,805                                                    March 11, 1969

Francis M. Romberg

It is certified that error appears in the above identified patent and that said Letters Patent are hereby corrected as shown below:

Column 1, line 41, "which" should read -- with --. Column 3, line 53, "and" should read -- an --. Column 4, line 2, "16α" should read -- 16a --. Column 6, line 70, "didoes" should read -- diodes --. Column 8, line 4, cancel "stage", second occurrence. Column 9, line 33, after "claim" insert the claim reference numeral -- 3 --. Column 10, line 12, after "with" insert -- a --; line 19, "assocaited" should read -- associated --; line 27, "plyaback" should read -- playback --; line 39, "pedetermined" should read -- predetermined --; line 74, "comprising" should read -- comparing --.

Signed and sealed this 31st day of March 1970.

(SEAL)

Attest:

Edward M. Fletcher, Jr.                                         WILLIAM E. SCHUYLER, JR.

Attesting Officer                                                     Commissioner of Patents